(12) United States Patent
Sinha Roy et al.

(10) Patent No.: US 12,381,710 B2
(45) Date of Patent: Aug. 5, 2025

(54) CRYPTO PROCESSOR AND ELECTRONIC DEVICE INCLUDING THE SAME

(71) Applicants: Samsung Electronics Co., Ltd., Suwon-si (KR); Graz University of Technology, Graz (AT)

(72) Inventors: Sujoy Sinha Roy, Graz (AT); Ahmet Can Mert, Graz (AT); Aikata, Graz (AT); Sunmin Kwon, Seoul (KR); Youngsam Shin, Hwaseong-si (KR); Dong-Hoon Yoo, Gwacheon-si (KR)

(73) Assignees: Samsung Electronics Co., Ltd., Suwon-si (KR); Graz University of Technology, Graz (AT)

(*) Notice: Subject to any disclaimer, the term of this patent is extended or adjusted under 35 U.S.C. 154(b) by 226 days.

(21) Appl. No.: 17/966,200

(22) Filed: Oct. 14, 2022

(65) Prior Publication Data

US 2023/0132500 A1    May 4, 2023

(30) Foreign Application Priority Data

Nov. 4, 2021 (KR) .................. 10-2021-0150762
Feb. 18, 2022 (KR) .................. 10-2022-0021525

(51) Int. Cl.
*H04L 9/00* (2022.01)
*G06F 21/71* (2013.01)
(Continued)

(52) U.S. Cl.
CPC .............. *H04L 9/008* (2013.01); *G06F 21/71* (2013.01); *H04L 9/0618* (2013.01); *H04L 9/3093* (2013.01); *G06F 2211/007* (2013.01)

(58) Field of Classification Search
CPC ..... H04L 9/008; H04L 9/0618; H04L 9/3093; G06F 21/71; G06F 2211/007; G06F 21/602; G09C 5/00
See application file for complete search history.

(56) References Cited

U.S. PATENT DOCUMENTS 9,794,068 B2 * 10/2017 Yasuda .................. H04L 9/008
10,020,933 B2 * 7/2018 Yasuda ............... H04L 63/0861
(Continued)

FOREIGN PATENT DOCUMENTS

JP     2020-181233 A    11/2020
JP     2021-86178 A      6/2021
(Continued)

OTHER PUBLICATIONS

Katambo, Jimmy. A protocol for secure distributed spatial searching using homomorphic encryption. Diss. The University of Zambia (Year: 2019).*

(Continued)

*Primary Examiner* — Aravind K Moorthy
(74) *Attorney, Agent, or Firm* — NSIP Law

(57) ABSTRACT

Disclosed are apparatuses and methods with crypto processing. Computing devices may be interconnected to each other. Each computing device may be configured to perform polynomial operations based on homomorphic encryption. Memories may be configured to store instructions. Controllers may be configured to transfer instructions from the memories to the computing devices. One or more of the computing devices may each be configured to individually process, in parallel, at least a portion of the polynomial operations based on the homomorphic encryption according to an instruction transferred from a corresponding memory.

26 Claims, 10 Drawing Sheets

(51) Int. Cl.
*H04L 9/06* (2006.01)
*H04L 9/30* (2006.01)

(56) References Cited

U.S. PATENT DOCUMENTS

| | | | |
|---|---|---|---|
| 10,075,288 B1* | 9/2018 | Khedr | H04L 9/008 |
| 10,296,709 B2* | 5/2019 | Laine | G16B 50/30 |
| 10,635,824 B1* | 4/2020 | Triandopoulos | G06F 21/602 |
| 10,644,877 B2 | 5/2020 | Khedr et al. | |
| 11,101,976 B2* | 8/2021 | Cheon | H04L 9/304 |
| 12,001,577 B1* | 6/2024 | Xiong | G06N 3/04 |
| 12,192,320 B2* | 1/2025 | No | H04L 9/008 |
| 2014/0177828 A1* | 6/2014 | Loftus | H04L 9/0852 380/44 |
| 2015/0046708 A1* | 2/2015 | Yasuda | H04L 9/3093 713/168 |
| 2015/0215123 A1* | 7/2015 | Kipnis | H04L 9/08 380/46 |
| 2016/0350552 A1* | 12/2016 | Matsuzaki | G06F 16/9535 |
| 2017/0070340 A1* | 3/2017 | Hibshoosh | H04L 9/3026 |
| 2017/0134156 A1* | 5/2017 | Laine | H04L 9/008 |
| 2017/0134157 A1* | 5/2017 | Laine | G09C 1/00 |
| 2017/0180115 A1* | 6/2017 | Laine | H04L 9/0618 |
| 2017/0357749 A1* | 12/2017 | Laine | G16B 50/40 |
| 2018/0294950 A1* | 10/2018 | Khedr | H04L 9/008 |
| 2018/0375639 A1* | 12/2018 | Lauter | H04L 9/008 |
| 2018/0375640 A1* | 12/2018 | Laine | H04L 9/008 |
| 2019/0007197 A1* | 1/2019 | Laine | H04L 9/3093 |
| 2019/0349191 A1* | 11/2019 | Soriente | H04L 9/0844 |
| 2020/0403781 A1* | 12/2020 | Gentry | H04L 9/008 |
| 2021/0111863 A1* | 4/2021 | Trivedi | H04L 9/0894 |
| 2022/0029783 A1* | 1/2022 | Cheon | G06F 17/16 |
| 2022/0052848 A1* | 2/2022 | Kang | G06F 17/17 |
| 2022/0085972 A1* | 3/2022 | Jackson | H04L 9/008 |
| 2022/0116198 A1* | 4/2022 | Na | H04L 9/3093 |
| 2022/0366059 A1* | 11/2022 | Sasidharan Rajalekshmi | G11C 11/4094 |
| 2022/0385447 A1* | 12/2022 | Liao | H04L 9/008 |
| 2023/0008949 A1* | 1/2023 | Ahn | H04L 9/008 |
| 2023/0027423 A1* | 1/2023 | Rao | G06F 7/5443 |
| 2023/0145760 A1* | 5/2023 | Cheon | G06F 7/38 708/200 |
| 2023/0396409 A1* | 12/2023 | Joye | G06N 3/048 |
| 2024/0235809 A1* | 7/2024 | Cheon | H04L 9/08 |
| 2025/0030536 A1* | 1/2025 | Soriente | G06N 3/084 |

FOREIGN PATENT DOCUMENTS

| | | |
|---|---|---|
| KR | 10-2020-0140380 A | 12/2020 |
| KR | 10-2197874 B1 | 1/2021 |
| KR | 10-2021-0017054 A | 2/2021 |
| KR | 10-2021-0017249 A | 2/2021 |
| KR | 10-2021-0123889 A | 10/2021 |
| KR | 10-2317668 B1 | 10/2021 |

OTHER PUBLICATIONS

Riazi, M. Sadegh, et al. "HEAX: High-Performance Architecture for Computation on Homomorphically Encrypted Data in the Cloud" Proceedings of the Twenty-Fifth International Conference on Architectural Support for Programming Languages and Operating Systems. 2020., (18 pages in English).

Jung, Wonkyung, et al. "Accelerating fully homomorphic encryption through architecture-centric analysis and optimization." IEEE Access 9 (2021): 98772-98789.

Feldmann, Axel, et al. "F1: A fast and programmable accelerator for fully homomorphic encryption." MICRO-54: 54th Annual IEEE/ACM International Symposium on Microarchitecture. 2021., (15 pages in English).

Extended European search report issued on Mar. 28, 2023, in counterpart European Patent Application No. 22205288.8 (9 pages in English).

Roy, Sujoy Sinha, et al. "FPGA-based high-performance parallel architecture for homomorphic computing on encrypted data." *2019 IEEE International symposium on high performance computer architecture (HPCA)*. IEEE, (Feb. 2019). pp.387-398.

Riazi, M. Sadegh, et al. "HEAX: An architecture for computing on encrypted data." *Proceedings of the Twenty-Fifth International Conference on Architectural Support for Programming Languages and Operating Systems*. (Mar. 16, 2020).pp. 1295-1309.

Roy, Sujoy Sinha, et al. "HEPCloud: An FPGA-based multicore processor for FV somewhat homomorphic function evaluation." *IEEE Transactions on Computers* 67.11 (2018): pp. 637-1650.

Turan, Furkan, Sujoy Sinha Roy, and Ingrid Verbauwhede. "HEAWS: An accelerator for homomorphic encryption on the Amazon AWS FPGA." *IEEE Transactions on Computers* 69.8 (Apr. 20, 2020): pp. 1185-1196.

Sinha Roy, Sujoy, et al. "Modular hardware architecture for somewhat homomorphic function evaluation." *International Workshop on Cryptographic Hardware and Embedded Systems*. Springer, Berlin, Heidelberg, 2015.

* cited by examiner

| Execution order and synchronization | Core-All | Core-Dyadic |
|---|---|---|
| Synchronization<br><br>1110 — | R0 = Reduce(d0[j], q[j])<br>t0[j] ← INTT( R0 ) | temp1 ← a0[j] * b1[j]<br>temp2 ← a1[j] * b0[j]<br>d1[j] ← temp1 * temp2 —1120 |
| 1130 — Synchronization<br><br>1140 — | R1 = Reduce(d1[j], q[j])<br>t1[j] ← INTT( R1 ) | temp1 ← a2[j] * b3[j]<br>temp2 ← a3[j] * b2[j]<br>d2[j] ← temp1 * temp2 |

FIG. 11

CRYPTO PROCESSOR AND ELECTRONIC DEVICE INCLUDING THE SAME

CROSS-REFERENCE TO RELATED APPLICATIONS

This application claims the benefit under 35 USC § 119(a) of Korean Patent Application No. 10-2021-0150762, filed on Nov. 4, 2021, in the Korean Intellectual Property Office, and Korean Patent Application No. 10-2022-0021525, filed on Feb. 18, 2022, in the Korean Intellectual Property Office, the entire disclosures of which are incorporated herein by reference for all purposes.

BACKGROUND

1. Field

The following description relates to a crypto processor and an electronic device including the same.

2. Description of Related Art

Homomorphic encryption is an encryption method that enables arbitrary logical or mathematical operations to be performed on ciphertext while allowing the transformed ciphertext to be decrypted. With homomorphic encryption, decryption is not required when processing encrypted data (i.e., ciphertext), so security is maintained during the processing of the encrypted data. Through homomorphic encryption, it is possible to use various services (e.g., cloud services) by transmitting information in encrypted form (i.e., ciphertext) to the services (e.g., a machine learning service), and those services can operate on the information in its encrypted form without risk of data privacy infringement or theft of the information in its unencrypted form (i.e., without exposing the cleartext corresponding to the ciphertext).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An apparatus may include computing devices interconnected to each other. Each of the computing devices may be configured to perform polynomial operations based on homomorphic encryption. Memories may be configured to store instructions, and controllers may transfer instructions from the memories to the computing devices. One or more of the computing devices may each be configured to individually process, in parallel, at least a portion of the polynomial operations based on the homomorphic encryption according to an instruction transferred from a corresponding memory.

Each of the computing devices may be configured to transmit data to another computing device through direct communication therewith. The direct communication may not include intervention of the memories and the controllers.

The computing devices may be configured into groups thereof. One or more of the computing devices included in a first group may be configured to perform a first operation among the polynomial operations and another of the computing devices included in a second group may be configured to perform a second operation among the polynomial operations.

Each of the computing devices may include, respectively: one or more first cores configured to execute a plurality of instructions; and one or more second cores configured to execute a proper subset of the instructions in the plurality of instructions. The one or more first cores may be configured to execute instructions independently of the one or more second cores.

The one or more first cores may operate in parallel with the one or more second cores, and the one of more first cores may be configured to have the operation thereof synchronized with the operation of the one or more second cores.

A first of the computing devices may transmit data through direct communication with another of the computing devices that is not adjacent to the first computing device in a ring structure.

A first of the memories and a first of the controllers may provide instructions to a first group of the computing devices for processing thereby, and a second of the memories and a second of the controllers may provide instructions to a second group of the computing devices for processing thereby.

The apparatus may receive a polynomial representation that represents either plaintext in which a message is encoded or represents a ciphertext in which plaintext is encrypted.

The ciphertext may be expressed by a first polynomial corresponding to the message and a second polynomial corresponding to an encryption key.

The polynomial operations may include one or more of a number theoretic transform (NTT) operation, or an inverse number theoretic transform (I NTT) operation.

The polynomial operations may include polynomial addition, polynomial subtraction, polynomial multiplication, or a polynomial multiplier-accumulator (MAC) operation.

Each processing device may include a respective processor, and each processor may be configured to directly exchange data and/or instructions with at least one other processor.

An electronic device may include: a crypto processor that performs polynomial operations on homomorphic ciphertexts such that a homomorphic property of the ciphertexts is preserved by the polynomial operations. The crypto processor may include: processors directly interconnected to each other, each processor configured to perform the polynomial operations. Each of the processors may, respectively, concurrently perform at least a portion of the polynomial operations.

Memories and controllers may provide instructions to the processors. Each of the processors may transmit data to at least one other processor through direct communication therewith. The direct communication may be performed without requiring intervention of the memories or the controllers.

One or more of the processors included in a first group of the processors may perform a first operation among the polynomial operations, and one or more processors in a second group of the processors may perform a second operation different from the first operation among the polynomial operations.

Each of the processors may include: one or more first cores that perform an operation by executing a plurality of instructions received thereby, and one or more second cores that may perform an operation by executing a proper subset of the instructions in the plurality of instructions. The one or more first cores may perform their corresponding operation independently of the one or more second cores performing their operation.

One or more first cores may perform their operation in parallel with the one or more second cores performing their operation, and the one or more first cores and the one or more second cores may be synchronized in association with executing their respective operations.

A first of the processors may transmit data through direct communication with a second of the processors that is not adjacent, in a ring structure, to the first of the processors.

Each of the processors may be grouped as one group and may process an instruction received from a corresponding memory as instructed by a corresponding controller.

The crypto processor may operate on a polynomial generated by a homomorphic encryption algorithm, the polynomial corresponding to a plaintext encoding of a message or a ciphertext encryption of the plaintext.

A method may involve: receiving, by a processor, a ciphertext that was generated by a computing device executing a homomorphic encryption algorithm on a plaintext, the ciphertext comprising coefficients representing terms of a polynomial, the processor including first cores and second cores, the first cores configured to perform a set of types of polynomial operations, the second cores configured to perform a subset of the types of polynomial operations; performing, by one of the first cores, a first type polynomial operation on the ciphertext or a polynomial derived from polynomial operations on the ciphertext; and in parallel with the one of the first cores performing the first polynomial operation, performing, by one of the second cores, a second type of polynomial operation on the ciphertext or a polynomial derived from polynomial operations on the ciphertext.

The first cores and the second cores may be interconnected to directly exchange instructions and/or data.

The first cores and the second cores may be interconnected to each other.

The first cores may be residue polynomial arithmetic units (RPAUs).

The RPAUs may implement a polymorphic arithmetic operation, and the second cores may not to be configured for, or capable of, performing the polymorphic arithmetic operation.

The processor may output a second ciphertext generated by the first and second cores performing operations on the ciphertext. A second plaintext may be generated by homomorphically decrypting the second ciphertext. The second plaintext may correspond to a value that would result from performing the operations on the plaintext.

Other features and aspects will be apparent from the following detailed description, the drawings, and the claims.

BRIEF DESCRIPTION OF THE DRAWINGS

FIG. 11 illustrates an example of synchronization and operations, according to one or more embodiments.

Figure 1:
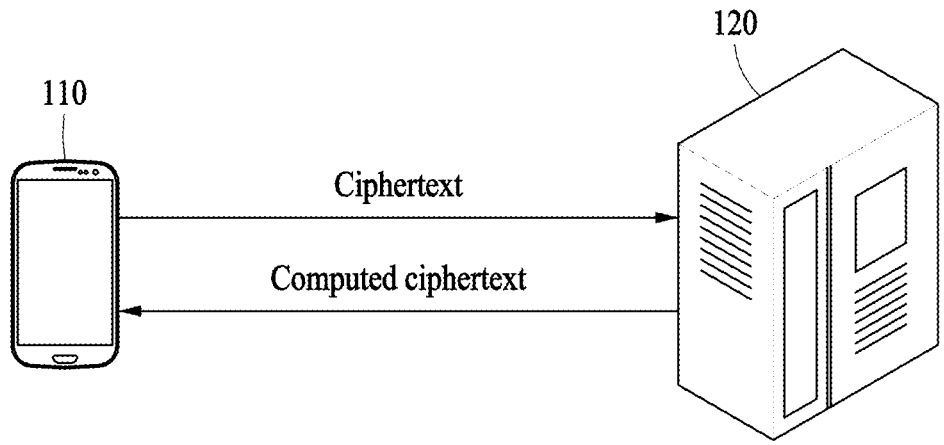
FIG. 1 illustrates an example of operations of a server and a user terminal processing a ciphertext based on homomorphic encryption, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "comprises" and/or "comprising," when used in this specification, specify the presence of stated features, integers, operations, elements, components or a combination thereof, but do not preclude the presence or addition of one or more other features, integers, operations, elements, components, and/or groups thereof.

Unless otherwise defined, all terms including technical or scientific terms used herein have the same meaning as commonly understood by one of ordinary skill in the art to which examples belong. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of operations of a user terminal 110 and a server 120 processing a ciphertext based on homomorphic encryption, according to one or more embodiments. The user terminal 110 may be a device controlled by a user, and may be embodied as any of various devices such as a smartphone, a personal computer (PC), a tablet PC, a laptop computer or the like, various wearable devices such as a smart watch, smart glasses, and the like, various home appliances such as a smart speaker, a smart TV, a smart refrigerator, and the like, a smart car, a smart kiosk, an Internet of things (IoT) device, a drone, and a robot, for example. The user terminal 110 may also be a virtual machine, a cloud-based user shell, or similar construct. The user terminal may include an I/O interface such as a graphical or physical keyboard, camera, microphone, etc., as well as a display, speaker, etc. The user terminal 110 may encrypt data for information protection and transmit the encrypted data to the server 120 where it is to be used in conjunction with any of various services provided by the server 120 (e.g., a machine learning service). For processing of the encrypted data by the server 120, the encrypted data transmitted to the server 120 may have been encrypted based on homomorphic encryption. Encrypted data may also be referred to herein as ciphertext and unencrypted data may also be referred to herein as plaintext.

Homomorphic encryption is an encryption technique that allows operations to be performed on ciphertext and transform the ciphertext without having to decrypt the ciphertext. For example, with homomorphic encryption, when ciphertext is decrypted after performing several such operations on the ciphertext (i.e., after the ciphertext has been transformed), a result of decrypting the transformed ciphertext may be the same result as if those same operations had been performed on the corresponding plaintext. Since the data remains encrypted during those transformative operations, even if a hacker succeeds in stealing the data before, during, or after the operations, the plaintext may nonetheless not be exposed. In addition, the same operations or data processing applied to the ciphertext may be applied to other data that is not encrypted. That is, the basic functionality of services that may operate on unencrypted data may not need to be modified to allow them to operate on homomorphic ciphertext. Therefore, homomorphic encryption may be suitable for various applications that process data and require privacy protection.

Homomorphic ciphers may add noise to a ciphertext, and as operations on the ciphertext are performed, a corresponding noise level of the ciphertext may increase. To prevent noise from overwhelming the data in the ciphertext, noise processing, for example, bootstrapping may be used to refresh the noise. Through bootstrapping, a parameter size and computational overhead may be capped, regardless of a circuit depth.

To elaborate, a ciphertext encrypted with homomorphic encryption may have a maximum number of operations that may be performed on it before the resulting noise renders the ciphertext undecryptable unless the ciphertext is refreshed with bootstrapping. Otherwise, after the maximum number of operations, the ciphertext may become undecryptable. This level may be expressed as a level l ($0 < l \leq L$). Bootstrapping may refresh a level-0 ciphertext (one for which no more operations may be performed) to a level-L ciphertext. That is, bootstrapping may be used to reduce noise in the ciphertext to maintain its decryptability.

The bootstrapping may allow the server 120 to continue performing various operations on the ciphertext and resolve noise accumulation without having to decrypt the ciphertext, so the plaintext information is not exposed as the server 120 transforms the ciphertext. The ciphertext operated on and transformed in the server 120 may then be transmitted to the user terminal 110. The user terminal 110 may then provide the original data, as manipulated by the server 120, by decrypting the ciphertext from the server 120 to make the data available to a user or to use the data for a subsequent operation.

Figure 2:
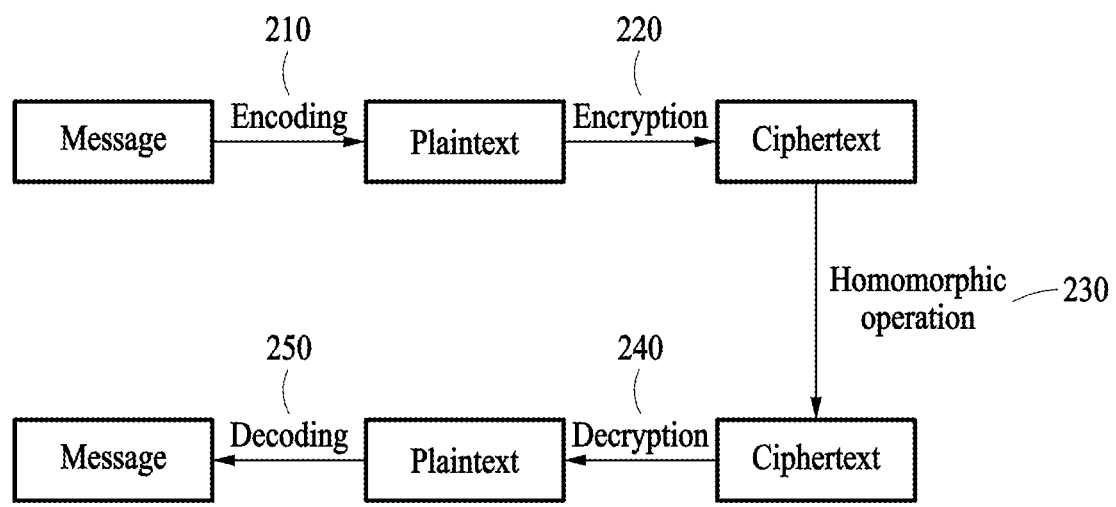
FIG. 2 illustrates an example of processing data based on homomorphic encryption, according to one or more embodiments.

FIG. 2 illustrates an example of processing data based on homomorphic encryption, according to one or more embodiments. In operation 210, a message (information to be secured) may be encoded into plaintext, which may be expressed in a polynomial form (i.e., as coefficients of a first polynomial). In operation 220, the plaintext may be encrypted into a ciphertext. In some embodiments, where grid-based encryption is used (for example, ring learning with error (ring-LWE)-based homomorphic encryption), the ciphertext may be generated based on (i) the first polynomial (the plaintext encoding of the message) and (ii) an encryption key in the form of a second polynomial (i.e., coefficients thereof). In sum, the message is information of interest that is to be securely delivered, and the encryption key is a value used for encryption and/or decryption of the message.

A number of polynomials constituting a ciphertext may be referred to as a size of the ciphertext. When the ciphertext is expressed by a first polynomial and a second polynomial, the size may be 2. As shown in Equation 1, two polynomials expressing the ciphertext may be expressed as an (n−1)-th degree polynomial including n coefficients smaller than a modulus q.

$$A(x) = a_{n-1}X^{n-1} + a_{n-2}X^{n-2} + \ldots + a_0 X^0$$

$$B(x) = b_{n-1}X^{n-1} + b_{n-2}X^{n-2} + \ldots + b_0 X^0 \qquad \text{Equation 1}$$

In operation 230, a homomorphic operation may be performed on the ciphertext. Although the homomorphic operation may vary depending on the application, ciphertext multiplication is an example of a basic homomorphic operation. Multiplication between arbitrary ciphertexts (e.g., two ciphertexts derived by operations on the ciphertext of operation 220) may be expressed as multiplication between a plurality of polynomials included in each of the ciphertexts. To reduce computational complexity, multiplication of two polynomials may be performed after transforming the polynomials through integer fast Fourier transform (FFT), that is, number theoretic transform (NTT).

Figure 3:
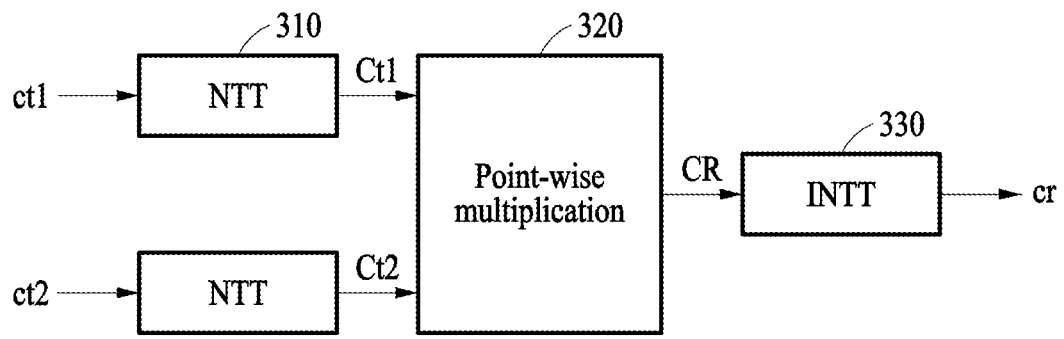
FIG. 3 illustrates polynomial multiplication using number theoretic transform (NTT), according to one or more embodiments.

FIG. 3 illustrates polynomial multiplication using NTT, according to one or more embodiments. Two ciphertexts ct1 and ct2 that are to be multiplied may be respectively converted through NTT modules 310 to obtain Ct1 and Ct2, which may be expressed as follows.

$$NTT(ct1) = Ct1 = (A1, B1)$$

$$NTT(ct2) = Ct2 = (A2, B2) \qquad \text{Equation 2}$$

Ct1 may be obtained by converting the ciphertext ct1 through NTT. Ct1 may be expressed by A1, which represents a set of coefficients of a first polynomial corresponding to a first message, and B1, which represents a set of coefficients of a second polynomial corresponding to a first encryption key. Likewise, Ct2 may be obtained by converting the ciphertext ct2 through NTT. Ct2 may be expressed by A2, which represents a set of coefficients of a third polynomial corresponding to a second message, and B2, which represents a set of coefficients of a fourth polynomial corresponding to a second encryption key. A polynomial coefficient set may include n coefficients included in a corresponding polynomial and may be represented as, for example, A={a0, a1, . . . , an−1}.

Multiplication of two ciphertexts using the NTT may be performed by a point-wise multiplication module 320 that performs point-wise multiplication between polynomial coefficient sets constituting the two respective ciphertexts. A point-wise multiplication result CR may be expressed as follows.

$$CR = (Ar, Br, Cr) \quad \quad \text{Equation 3}$$
$$= Ct1 * Ct2$$
$$= (A1, B1) * (A2, B2)$$
$$= (A1 * A2, A1 * B2 + B1 * A2, B1 * B2)$$

In Equation 3, "*" denotes point-wise multiplication, and may indicate multiplication between coefficients of a same degree in each polynomial.

The multiplication result CR may be expressed as Ar, Br, and Cr, each representing a set of polynomial coefficients. Because the number of polynomials increases to three as a result of the multiplication, the number of polynomials may be reduced to two again through post-processing (not shown). The multiplication result CR may be transformed by an inverse number theoretic transform (I NTT) module 330 to obtain a resulting ciphertext cr.

The description of FIG. 3 is based on a case in which the point-wise multiplication is performed by converting the ciphertext through NTT. However, this is merely an example. In some cases, the point-wise multiplication may be performed by converting the plaintext of FIG. 2 through NTT. In such cases, the above description may be similarly applied.

Referring to FIG. 2, in operation 240, a computed plaintext may be obtained by decrypting the ciphertext on which the homomorphic operation has been performed. In operation 250, a computed plaintext may be decoded to obtain the message as modified by the aforementioned operation.

A degree of a polynomial may be increased to increase an encryption level or an operable level of the homomorphic encryption. The increased degree of the polynomial may result in a commensurate increase in memory storage space, memory read/write, and a number of operations for a corresponding coefficient. Therefore, a method for a computing device to accelerate polynomial operations based on the homomorphic encryption with increased efficiency may be beneficial. A computing device for accelerating polynomial operations based on the homomorphic encryption will now be described in greater detail with reference to the drawings below. Note that as used herein, the term "computing device" will generally refer to a processor, for example a chip.

Homomorphic encryption is discussed herein for convenience of explanation, but the described embodiments may be similarly applied in other circumstances, such as when lattice-based polynomial multiplication is based in post-quantum cryptography (PQC).

Figure 4:
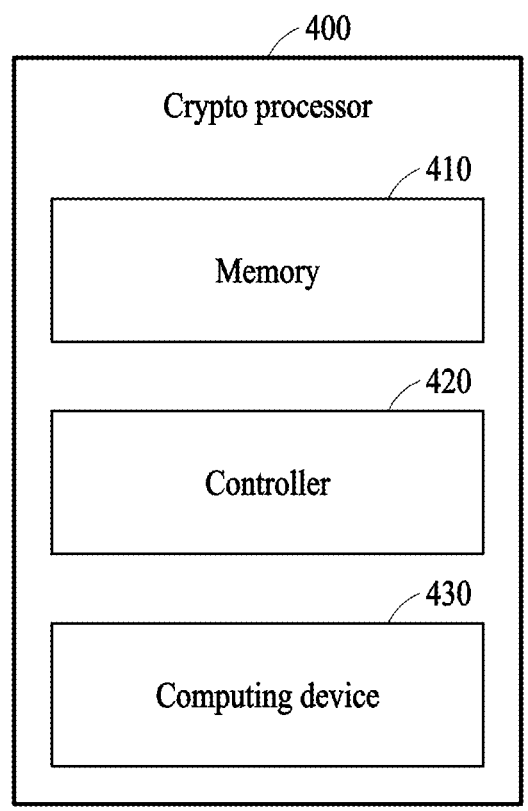
FIG. 4 illustrates an example of a crypto processor, according to one or more embodiments.

FIG. 4 illustrates an example of a crypto processor 400, according to one or more embodiments. The crypto processor 400 may include a memory 410, a controller 420, and a computing device 430. The memory 410 is a device for storing one or more instructions executable by the computing device 430, and may also be referred to as, for example, a program memory. The crypto processor 400 may be a processor based on an instruction set architecture (ISA) by operating based on one or more instructions, i.e., the crypto processor 400 may be configured to execute instructions in the ISA, and the ISA may include instructions for homomorphic polynomial operations.

The controller 420 is a device that transfers the instructions stored in the memory 410 to the computing device 430 and may also be referred to as, for example, a program controller.

The computing device 430 may perform a polynomial operation based on homomorphic encryption in accordance with the instructions transmitted from the memory 410 by the controller 420.

The crypto processor 400 may include the above-described elements to process and operate an instruction by itself, i.e., without the control of an external master or host. For brevity, one memory 410, the controller 420, the computing device 430, and the crypto processor 400 are discussed with reference to the example of FIG. 4. However, in some embodiments there may be two or more of any of these components.

Figure 5:
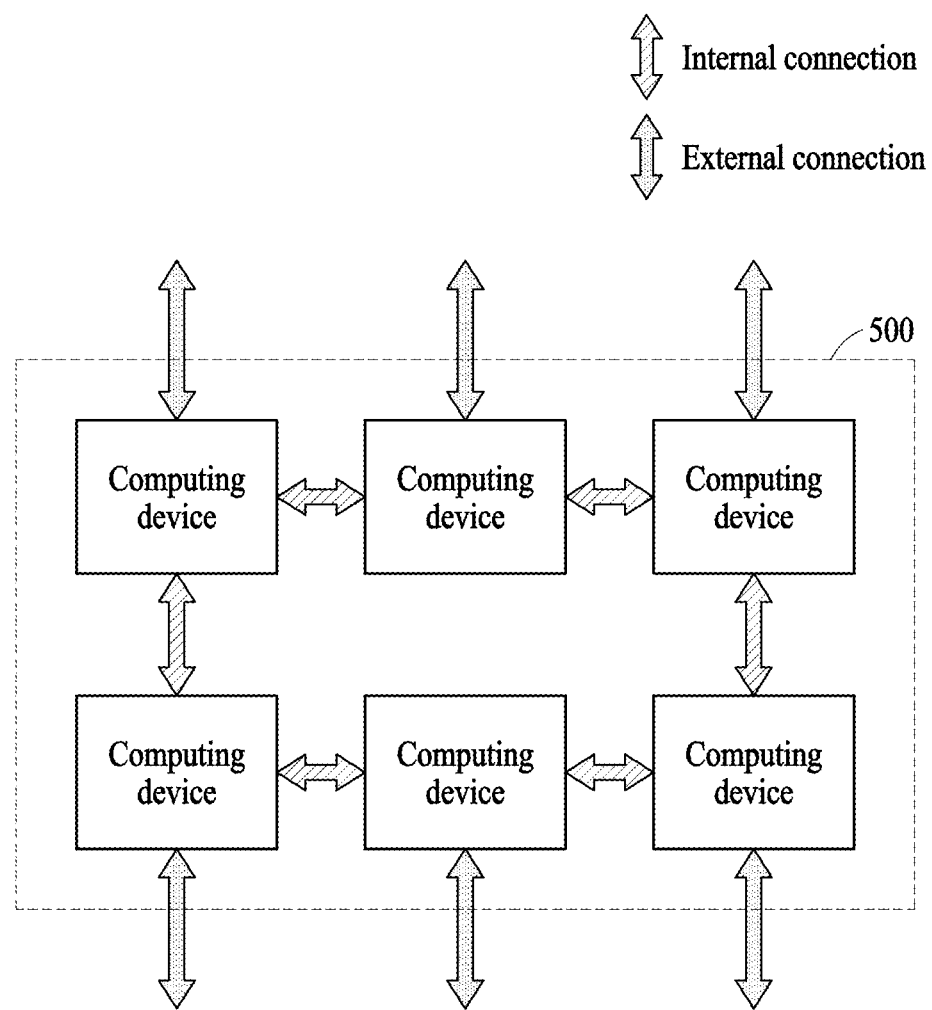
FIG. 5 illustrates an example of a connection structure of a plurality of computing devices, according to one or more embodiments.

FIG. 5 illustrates an example of a connection structure of a plurality of computing devices, according to one or more embodiments. A crypto processor 500 may include a plurality of computing devices. The plurality of computing devices may be arranged with interconnections therebetween to form a ring structure or architecture.

Since the plurality of computing devices may be connected in a ring structure (some embodiments may not involve a ring structure), when data is to be exchanged between the computing devices, data may sometimes be transferred through direct communication between the computing devices without the data passing through a separate bus or external memory. Each of the plurality of computing devices may be connected to its adjoining computing devices, and the direct connections therebetween may also be referred to as internal connections, as shown in the example of FIG. 5. By directly connecting the plurality of computing devices in a ring structure, it may be possible to efficiently arrange the computing devices when designing hardware, shortening a routing path connecting the computing devices, and/or improving operating frequencies of the computing devices. Further, using the ring structure for the plurality of computing devices may minimize memory accesses.

As illustrated in FIG. 5, each of the computing devices may be connected to an external memory through a respective external connection. For example, the plurality of computing devices may read or receive operands of operations to be performed through access to the external memory based on their respective external connections to the external memory. However, the present example is not limited in this way.

Figure 6:
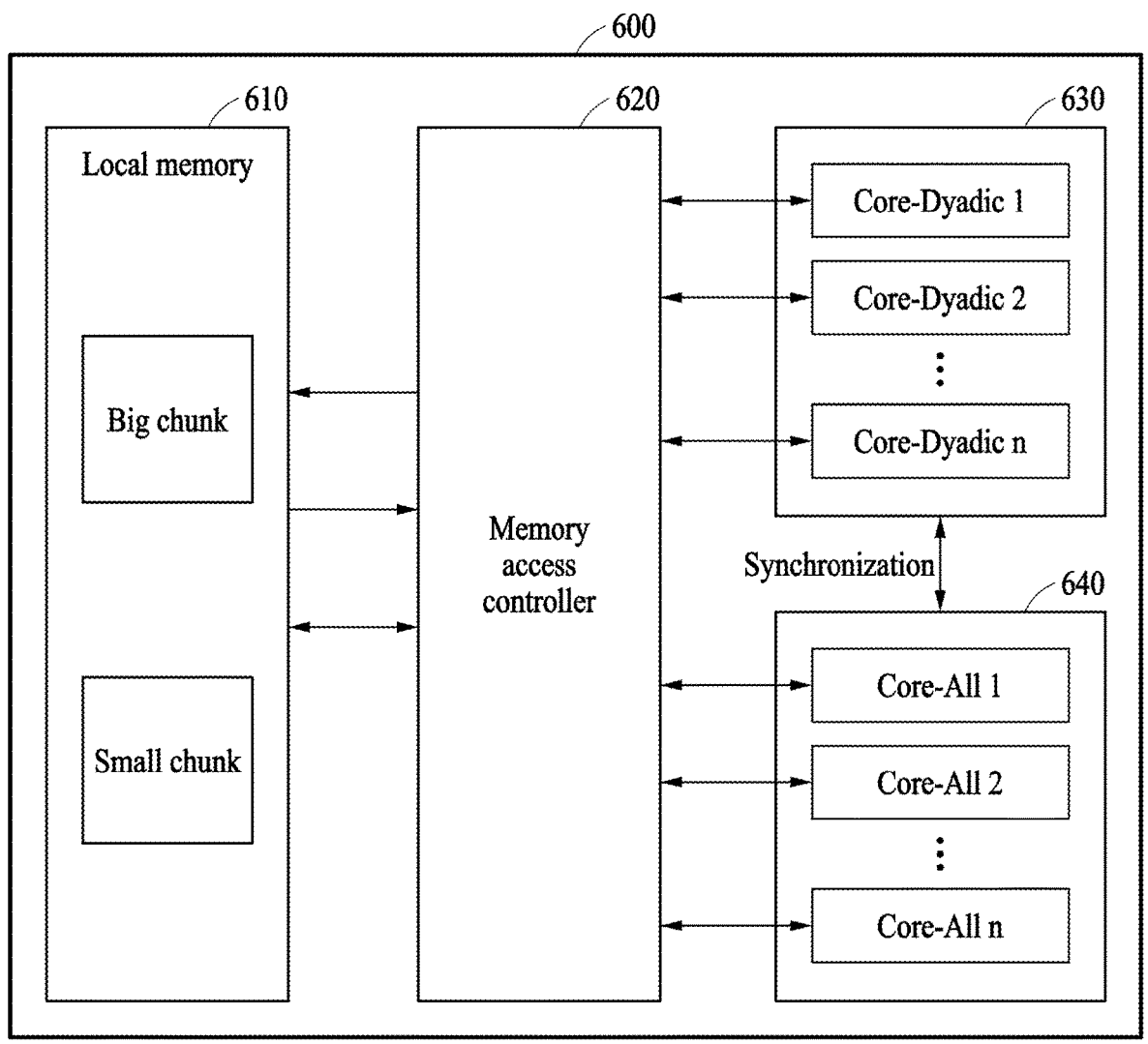
FIG. 6 illustrates an example of a computing device, according to one or more embodiments.

FIG. 6 illustrates an example of a computing device 600, according to one or more embodiments. The computing device 600 may include a local memory 610, a memory access controller 620, first cores 630, and second cores 640. For example, the computing device 600 may be a residue polynomial-based computing device (e.g., a multi-core processor/chip) used in homomorphic encryption or cryptography and may be referred to as a residue polynomial arithmetic unit (RPAU).

The local memory 610 may be a device for storing instructions and data to processed by the first cores 630 and the second cores 640 and may be disposed inside the computing device 600. For example, the local memory 610 may be configured as a heterogeneous on-chip memory, and may include a big chunk (e.g., a slow cache) and a small chunk (e.g., a fast cache). The big chunk may be a local memory that stores units of data having a relatively large size, and the small chunk may be a local memory that stores units of data having a relatively small size. For example, the small chunk may be frequently used and have a relatively smaller size, and the big chunk may be less frequently used and have a relatively larger size.

The memory access controller 620 may be a device used for controlling data communication between the local memory 610 and the first cores 630 and the second cores 640. The memory access controller 620 may transmit data stored in the local memory 610 to one or more of the first cores 630 and the second cores 640 so that the data is processed. The memory access controller 620 may be connected to the first cores 630 and/or the second cores 640 through a bus or network to transfer data received from the local memory 610 and/or external memory to the first cores 630 and/or the second cores 640.

The first cores 630 may perform basic (or first) operations, for example, addition, subtraction, multiplication, and MAC (multiply accumulate) operations, which may be polynomial operations based on homomorphic encryption (i.e., the operations may be homomorphic operations that preserve the homomorphic property of a homomorphic ciphertext). The first cores 630, e.g., n cores, may be configured to execute in parallel. In some cases, n first cores may respectively process different instructions (n being 1 or more). Each of the first cores 630 may be referred to as a Core-Dyadic.

The second cores 640 may perform an NTT operation and/or an INTT operation in addition to performing the above-described basic (or first) operations (e.g., operations such as addition, subtraction, multiplication, and/or MAC operation). In the second cores 640, m cores may be configured to execute in parallel with respect to each other and/or with respect to the first cores 630. In some cases, m second cores may, at any given time, respectively process different instructions in parallel, m being 1 or more. Each of the second cores 640 may be referred to as a Core-All.

The first cores 630 and the second cores 640 may simultaneously process, in parallel, a same instruction or different instructions. A connection for synchronization (e.g., Sync connection) may exist between the first cores 630 and the second cores 640. In such connection, even if two operations are performed simultaneously and terminate at different times, a start time of a next operation may be adjusted through synchronization. Synchronization between the first cores 630 and the second cores 640 will be described below with reference to FIG. 11.

To elaborate on the Core-Dyadic and the Core-All cores discussed above, consider that in a residue number system (RNS)-based homomorphic encryption scheme, an arithmetic operator may be applied to a "vector" of residue polynomials. To benefit from arithmetic parallelism, high-level units for processing residue polynomials in parallel may be used. These units have been referred to as Residue Polynomial Arithmetic Unit (RPAU) and they usually have their own instruction set architecture (ISA). High-level instructions may be translated into instructions of the RPAU's ISA. The organization of polynomial arithmetic cores and memory elements in some embodiments of RPAUs described herein may be based on the observation that an inner loop of key-switching or re-linearization executes one NTT and several coefficient-wise polynomial operations. Therefore, having two groups of cores may be beneficial, namely the Core-All cores (i.e., RPAU-All cores) and the Core-Dyadic (i.e., RPAU-Dyadic). The Core-All (RPAU-All) group may be capable of rapidly performing various kinds of polynomial arithmetic operations, using, for example, sixteen cores. The Core-Dyadic (RPAU-Dyadic) group may, in some implementations, only perform coefficient-wise (i.e., dyadic) operations using, for example, only four cores. The two core groups (and respective compute domains) may be executed in parallel during keyswitching (or re-linearization) and re-scaling (or mod-down) operations.

Figure 7:
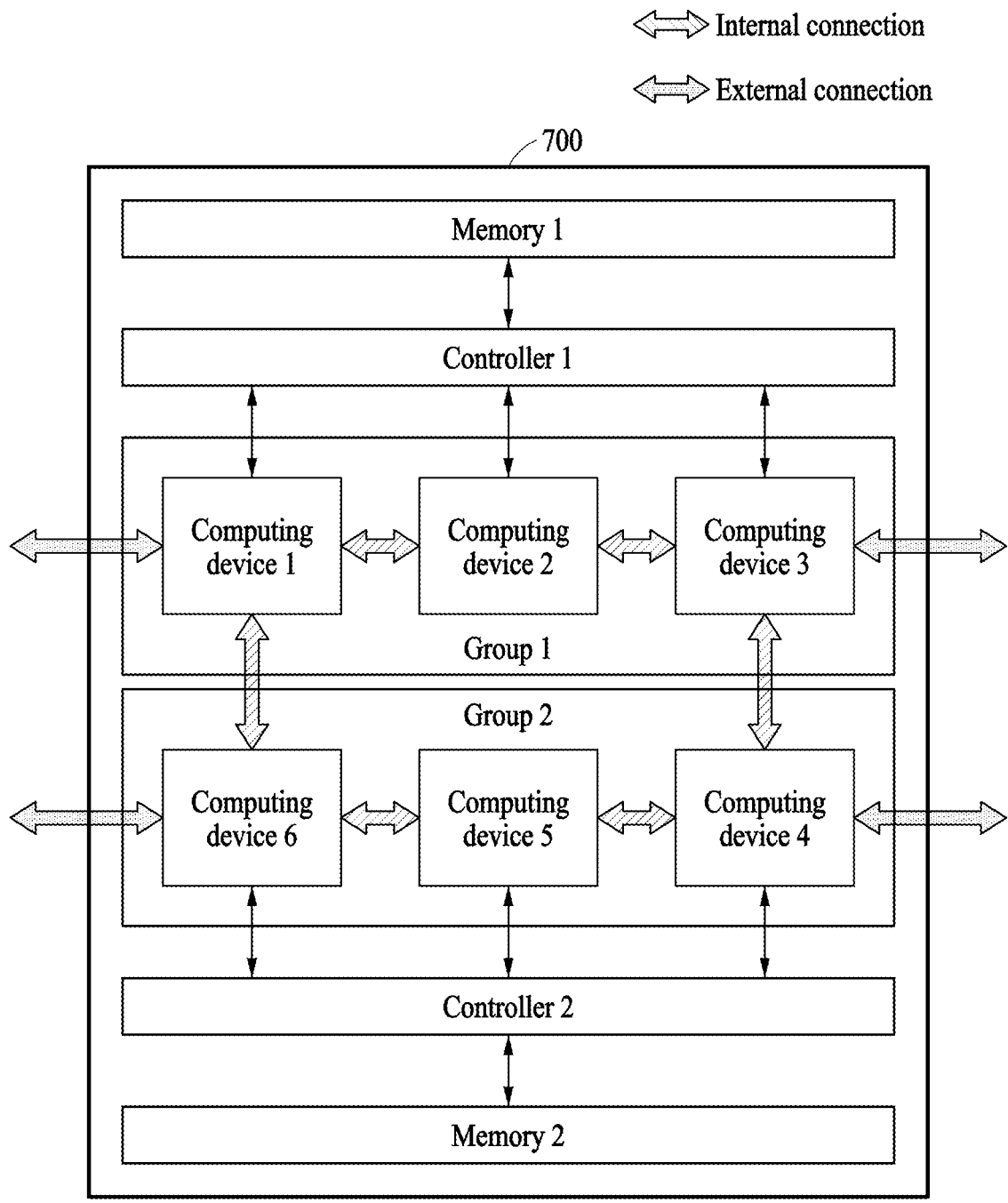
FIG. 7 illustrates an example of an operation of a crypto processor, according to one or more embodiments.

FIG. 7 illustrates an example of an operation of a crypto processor 700, according to one or more embodiments. The crypto processor 700 (e.g., a chip) may include a plurality of memories, a plurality of controllers, and a plurality of computing devices. As a non-limiting example, the crypto processor 700 may correspond to any one or any combination of crypto processors described herein. The memories and controllers described here are non-limiting examples of the memories and controllers shown in FIG. 7. Moreover, the numbers of the memories, controllers, and computing devices shown in FIG. 7 are merely examples and the present disclosure is not limited to the foregoing examples.

The plurality of computing devices included in the crypto processor 700 may be grouped into a plurality of groups. In the example of FIG. 7, the six computing devices may be split into two groups; group 1 and group 2. Each of the groups may have a respectively corresponding separate controller and memory. For example, computing devices 1 through 3 may be grouped into group 1, and a controller 1 that controls the computing devices of group 1 may transfer an instruction from memory 1 to group 1, i.e., to at least one of the computing devices 1 through 3. Likewise, computing devices 4 through 6 grouped into group 2 may process an instruction transferred from a memory 2 by a controller 2.

Since each of the groups has a corresponding controller and a corresponding memory, different instructions may be fed to and processed by each of the groups. For example, computing devices 1 through 3 belonging to group 1 may process an instruction 1 transferred from the memory 1 by the controller 1 in parallel, and computing devices 4 through 6 belonging to group 2 may process an instruction 2 transferred from the memory 2 by controller 2. However, this description does not exclude an example in which computing devices belonging to different groups process a same instruction in parallel, and the example may apply without limitation.

The plurality of computing devices may be interconnected in a ring structure so that any given computing device may transmit or receive data directly to or from an adjacent computing device. For example, computing device 1 may receive data from computing device 2 (belonging to the same group) or transmit data to computing device 2. Such direct data movement may be performed without necessarily requiring intervention of controller 1 or memory 1. In addition, computing device 2 may receive data even from computing device 6 (even though it belongs to a different group) or may transmit data to computing device 6. Such data movement may also be performed without the intervention of controllers 1 and 2 or the memories 1 and 2 (e.g., the data may be transferred by on-chip wires/lines between the computing devices). As such, since data movement between computing devices is performed without intervention of a controller or memory, unnecessary latency may be effectively reduced and performance of the crypto processor 700 may be improved. Further, the computing devices may also be connected to an external memory via respective external paths thereto. Although not shown in FIG. 7, computing devices 2 and 5 may also be connected to external memory through respective external paths.

Figure 8:
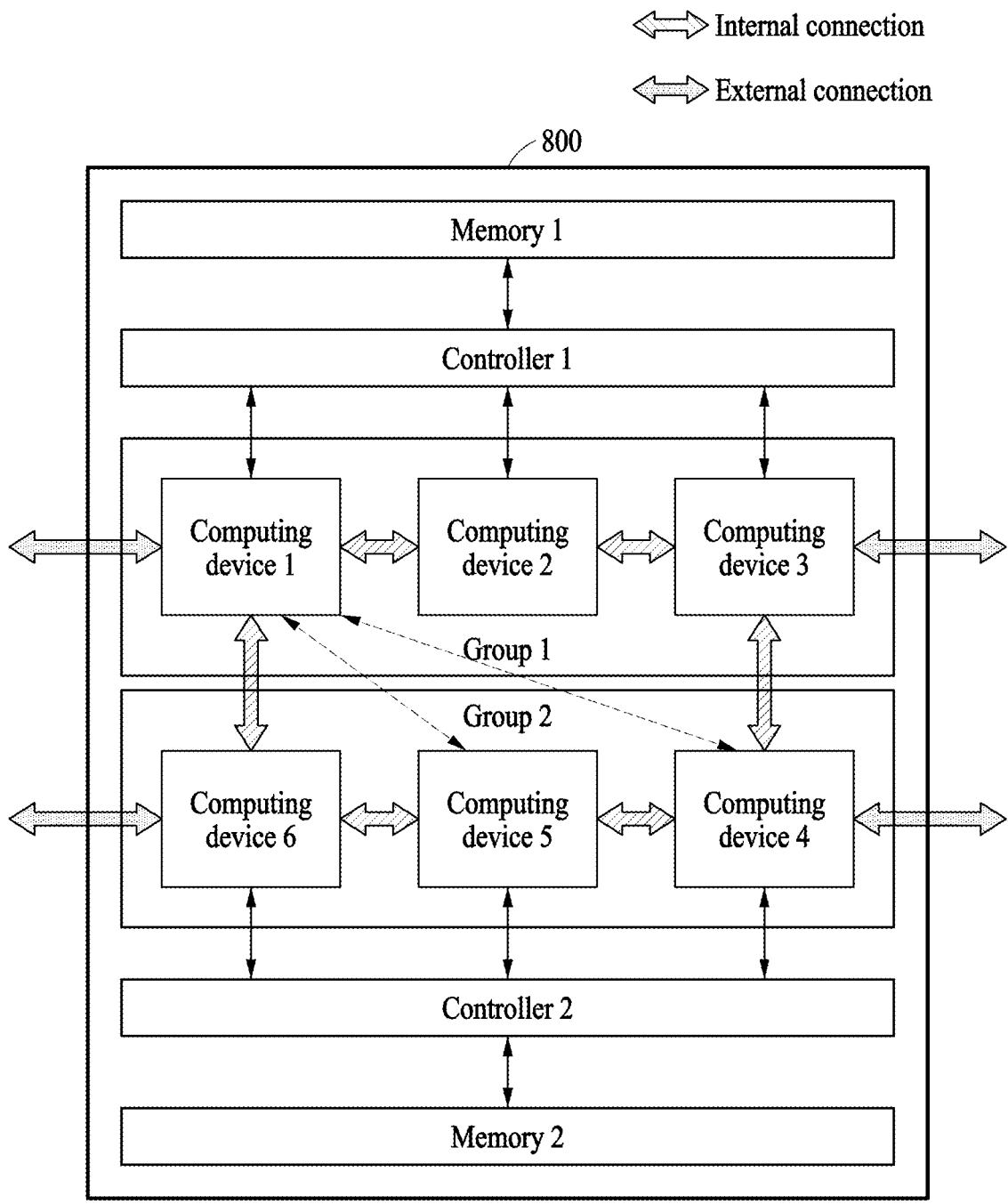
FIG. 8 illustrates a plurality of computing devices included in a crypto processor, according to one or more embodiments.

FIG. 8 illustrates a plurality of computing devices included in a crypto processor 800, according to one or more embodiments. The crypto processor 800 may include computing devices that are not limited to interconnections based on a ring structure. In the example of FIG. 7, since computing device 1 is only connected to its adjoining computing devices 2 and 6 in the ring structure, data may be transferred between computing device 1 and computing device 5 through the intervening computing device 6. The crypto processor 800 of FIG. 8 may be structured so that computing device 1 is directly connected to computing device 5, thus allowing data to be transmitted directly between computing device 5 and computing device 1 without passing computing device 6. Through this arrangement, a data transfer time may be shortened and an unnecessary resource use of computing device 6 may be prevented, so that the efficiency of the crypto processor 800 may be further improved.

Although FIG. 8 illustrates direct connections for computing devices 1 and 4 and direct connections for computing devices 1 and 5, direct connections between other computing devices may be provided.

Figure 9:
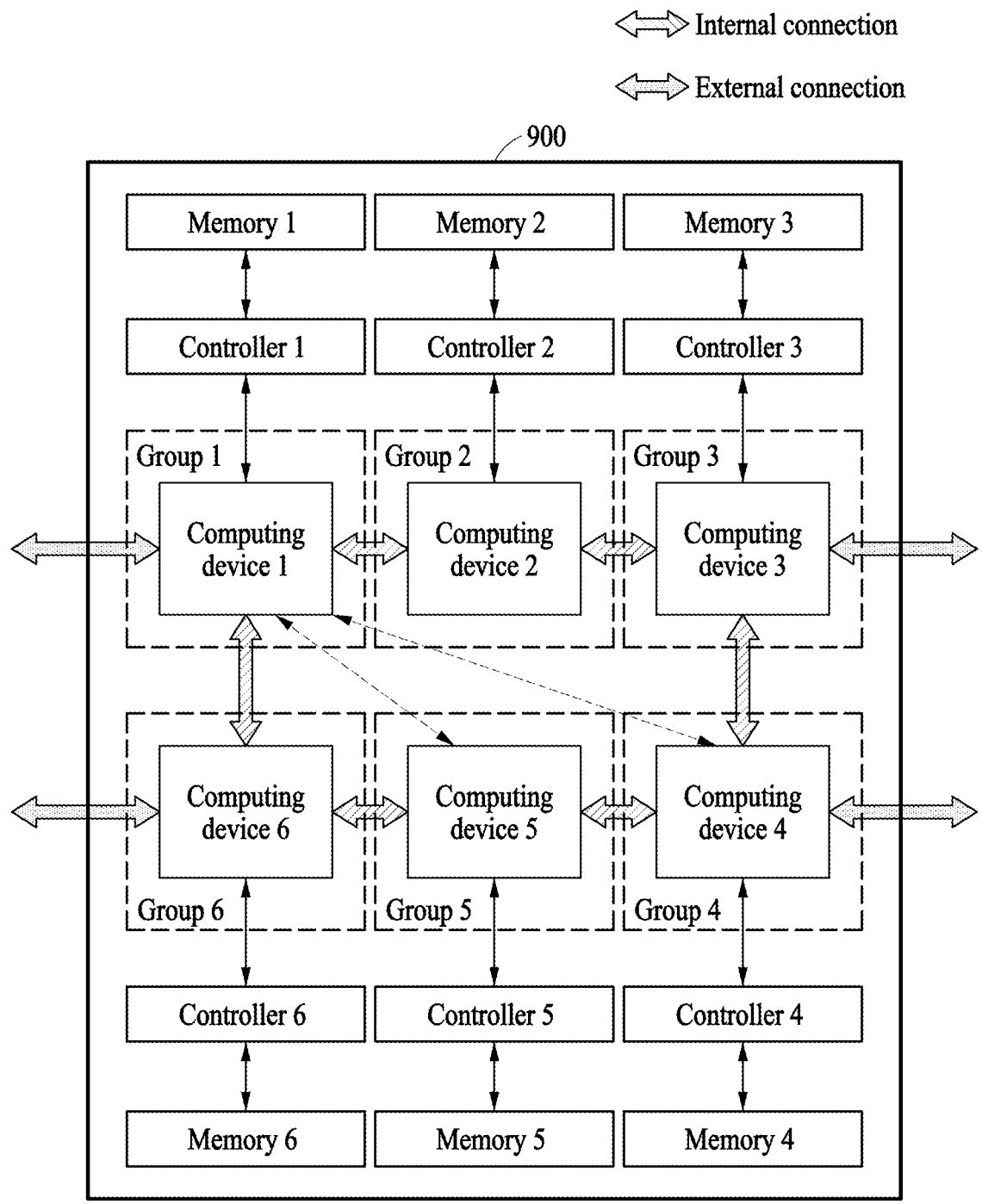
FIG. 9 illustrates groupings of computing devices included in a crypto processor, according to one or more embodiments.

FIG. 9 illustrates groupings of computing devices included in a crypto processor 900, according to one or more embodiments. For example, each of the computing devices may be grouped as an independent group. In this example, each group may have its own corresponding controller and corresponding memory. For example, computing device k may process an instruction transferred from a memory k by a controller k, k being a natural number from 1 to 6. With such a structure, different instructions corresponding to a number of computing devices (in the crypto processor 900) may be processed in parallel. If instructions that are not interdependent are simultaneously processed in parallel according to an application, an overall operation execution time may be shortened, which may lead to an improvement in the performance of the crypto processor 900.

Figure 10:
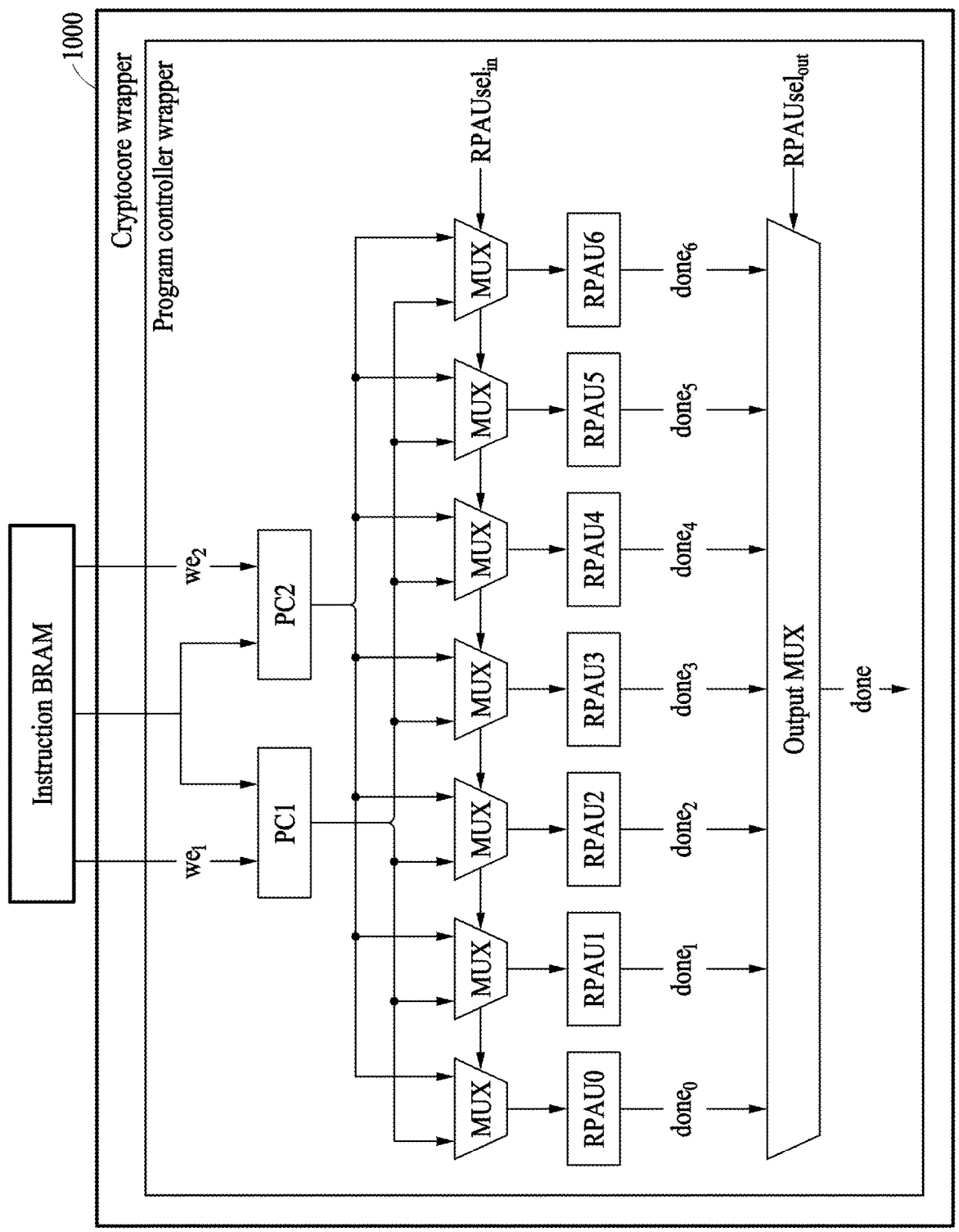
FIG. 10 illustrates a crypto processor having seven computing devices, according to one or more embodiments.

FIG. 10 illustrates a crypto processor 1000 having seven computing devices, according to one or more embodiments. The computing devices may be RPAUs, as discussed above. The crypto processor 1000 may have two controllers (shown as program controllers (PCs) in FIG. 10). Each of the two controllers may transfer instructions from an instruction block random access memory (BRAM) to a multiplexer (MUX) corresponding to the seven computing devices. For example, the first controller (PC1) may transfer a first instruction $we_1$ to one or MUXs and the second controller (PC2) may transfer a second instruction $we_2$ to one or more MUXs. In response to a selection signal RPAUselin, a MUX of FIG. 10 may transfer one of the instructions to a corresponding computing device (RPAUN). Results processed by the computing devices may be transmitted to an output MUX, so that one of the results may be finally outputted.

As described with reference to FIG. 6, a computing device may be provided with two types of cores to process an instruction. One type of core may process or execute one or more basic polynomial operations based on homomorphic encryption. The other type of core may process or execute an NTT operation and an INTT operation in addition to one or more polynomial operations (e.g., those executed by the first type of core). Cores of each type may process different respective instructions. As illustrated in FIG. 10, if the crypto processor 1000 has seven computing devices, 14 (=7×2) instructions may be executed in parallel. If n computing devices have m core types, at most (n×m) different instructions may be processed in parallel by the crypto processor 1000.

FIG. 11 illustrates an example of an operation of a computing device.

FIG. 11 illustrates an example of synchronization and operations processed in a first core (e.g., core-dyadic) and a second core (e.g., core-all) included in one computing device.

In operation 1110, the second core may perform an INTT operation on R0 and determine a result of the INTT operation to be t0[j]. In operation 1120, the first core may perform multiplication on temp1 and temp2 and determine a result of the multiplication to be d1[j]. If no new operation is allocated to the second core in the meantime and the INTT operation started in operation 1110 takes a long time, the second core may continue to perform the corresponding operation. In operation 1130, the first core and the second core may be synchronized with each other. At this time, d1[j] determined through operation 1120 of the first core may be transferred to the second core. In operation 1140, the second core may perform a reduce operation based on d1[j] determined operation 1120 of the first core and determine a result of the reduce operation to be R1.

As such, when two dependent operations are performed in different cores, synchronization between the first core and the second core may be performed. Through the synchronization, a subsequent dependent operation (possibly dependent on the previous outcomes) may be stably performed. In addition, by performing an operation that takes a relatively long time, such as the INTT operation or the NTT operation in the first core and performing a relatively simple operation in the second core several times in the meantime, the performance of the crypto processor may be effectively improved. Different amounts of time may be taken to perform homomorphic encryption-based operations (e.g., NTT operation, INTT operation, addition, subtraction, multiplication, and MAC operation), and in some cases, an application for which two or more operations are performed simultaneously may exist. Therefore, it may be more efficient to use various types of cores (or processors) in parallel rather than using multiple cores (or processors) of one type in parallel.

Figure 12:
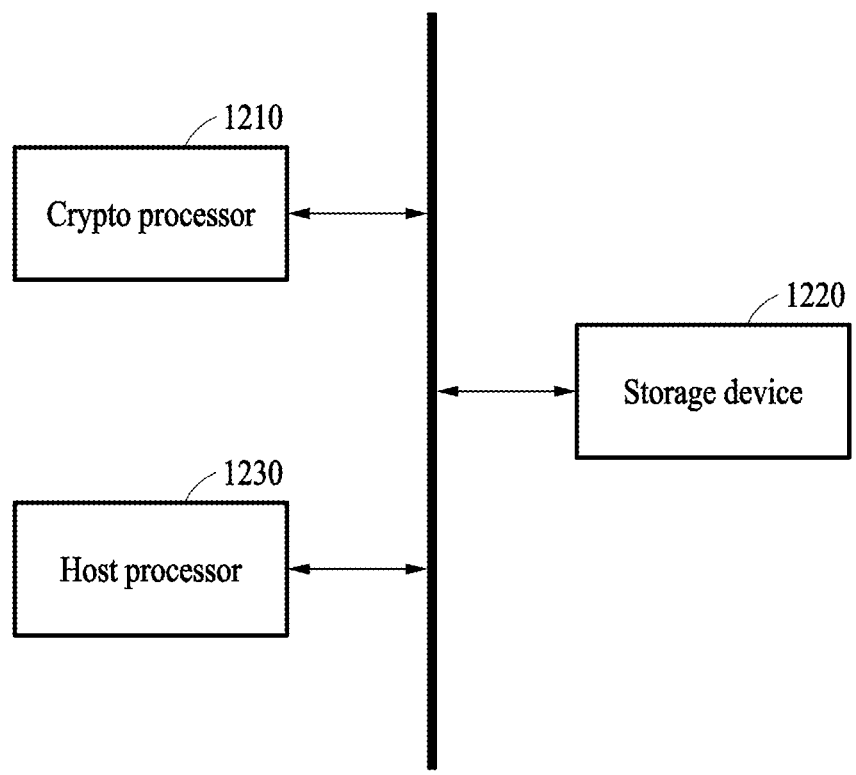
FIG. 12 illustrates an example of an electronic device, according to one or more embodiments.

FIG. 12 illustrates an example of an electronic device 1200 that includes a crypto processor 1210 and a storage device 1220, according to one or more embodiments. Additionally, the electronic device 1200 may also include a host processor (not shown). The crypto processor 1210, the storage device 1220, and the host processor may communicate with each other through a bus, a peripheral component interconnect express (PCIe), a network on a chip (NoC), and the like.

The crypto processor 1210 includes a plurality of computing devices interconnected in a ring-like structure to perform polynomial operations based on homomorphic encryption, memories including an instruction to be performed in a corresponding group in which at least one of the plurality of computing devices is grouped, and controllers that transfer an instruction stored in a corresponding memory to one or more computing devices in a corresponding group.

In accordance with their ring-like interconnectivity, the plurality of computing devices may be configured to transmit data to each other through direct communication without intervention of the memories and the controllers. One or more computing devices included in a first group among a plurality of groups may perform a first operation among the polynomial operations. One or more computing devices included in a second group (that is different from the first group) among the plurality of groups may perform a second operation (among the polynomial operations) that is different from the first operation.

Each of the plurality of computing devices may include one or more first cores that are configured to perform a plurality of instructions and one or more second cores that are configured to perform a portion (or proper subset) of that plurality of instructions. The one or more first cores and the one or more second cores may perform operations independently. The one or more first cores and the one or more second cores may be configured to execute in parallel and to be synchronized at a predetermined or instructed point in time.

In some examples, the computing devices may transmit data through direct communication with computing devices that are not adjacent in the ring structure. Each of the plurality of computing devices may be grouped as one group and process an instruction transferred from a corresponding memory by a corresponding controller. A polynomial operated on by any of the computing devices may be based on homomorphic encryption, i.e., may be ciphertext in which plaintext (an encoded message) is encrypted.

The storage device 1220 may be an external memory of the crypto processor 1210 and may store instructions for operating the crypto processor 1210 and operands of polynomial multiplication (e.g., polynomial coefficients, etc.). The crypto processor 1210 may perform the aforementioned operations in response to the instructions stored in the storage device 1220 being executed in the crypto processor 1210. The storage device 1220 may be a volatile memory or a non-volatile memory.

The host processor is a device that controls the electronic device 1200, and may include, for example, a central processing unit (CPU) and/or a graphic processing unit (GPU). The host processor may execute an application of homomorphic cryptography (e.g., polynomial multiplication of grid-based texts). For example, the host processor may use a homogeneous encryption library (e.g., simple encrypted arithmetic library (SEAL)), and the homogeneous encryption library may interface with a device driver for driving a hardware accelerator. The device driver may generate an instruction set for driving the hardware accelerator. The generated instruction set may be transmitted to an accelerator to execute the application of the homomorphic encryption, and a result thereof may be returned to the host processor.

In addition, the operations described herein may be processed in the electronic device 1200.

Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic unit or array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above. In addition, as a non-limiting example, the instructions may be hard-coded into a processor such as a DPU (e.g., where the DPU may be implemented as an FPGA). In some implementations, a DPU may be configured to perform any one, any combination, or all operations and/or methods described herein, e.g., with pluggable modules, as a non-limiting example.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An apparatus comprising:
   computing devices interconnected to each other, each of the computing devices configured to perform polynomial operations based on homomorphic encryption;
   memories configured to store instructions; and
   controllers configured to transfer executable instructions from the memories to the computing devices,
   wherein one or more of the computing devices are each configured to individually process, in parallel, at least a portion of the polynomial operations based on the homomorphic encryption according to an executable instruction transferred thereto by one of the controllers from a corresponding one of the memories.

2. The apparatus of claim 1, wherein each of the computing devices is configured to transmit data to another computing device through direct communication therewith and be interconnected with a ring structure, wherein the direct communication does not include intervention of the memories and the controllers.

3. The apparatus of claim 1,
   wherein the computing devices are configured into groups thereof,
   wherein one or more of the computing devices included in a first group are configured to perform a first operation among the polynomial operations, and
   wherein another of the computing devices included in a second group are configured to perform a second operation among the polynomial operations.

4. The apparatus of claim 1, wherein each of the computing devices comprises, respectively:
   one or more first cores configured to execute a plurality of instructions; and
   one or more second cores configured to execute a proper subset of the instructions in the plurality of instructions, and
   wherein the one or more first cores are configured to execute instructions independently of the one or more second cores.

5. The apparatus of claim 4, wherein the one or more first cores are configured to operate in parallel with the one or more second cores, and wherein the one of more first cores are configured to have the operation thereof synchronized with the operation of the one or more second cores.

6. The apparatus of claim 1, wherein a first of the computing devices is configured to transmit data through direct communication with another of the computing devices that is not adjacent to the first computing device in a ring structure.

7. The apparatus of claim 1, wherein a first of the memories and a first of the controllers are configured to provide instructions to a first group of the computing devices for processing thereby, and wherein a second of the memories and a second of the controllers are configured to provide instructions to a second group of the computing devices for processing thereby.

8. The apparatus of claim 1, wherein the apparatus is configured to receive a polynomial representation, wherein the polynomial representation represents either plaintext in which a message is encoded or it represents a ciphertext in which plaintext is encrypted.

9. The apparatus of claim 8, wherein the ciphertext is expressed by:
   a first polynomial corresponding to the message; and
   a second polynomial corresponding to an encryption key.

10. The apparatus of claim 1, wherein the polynomial operations comprise one or more of: a number theoretic transform (NTT) operation, or an inverse number theoretic transform (INTT) operation.

11. The apparatus of claim 10, wherein the polynomial operations further comprise one or more of: polynomial addition, polynomial subtraction, polynomial multiplication, or a polynomial multiplier-accumulator (MAC) operation.

12. The apparatus of claim 1, wherein each processing device comprises a respective processor, and wherein each processor is configured to directly exchange data and/or instructions with at least one other processor.

13. An electronic device comprising:
   a crypto processor configured to perform polynomial operations on homomorphic ciphertexts such that a homomorphic property of the ciphertexts is preserved by the polynomial operations, the crypto processor comprising:
      processors directly interconnected to each other, each processor configured to perform the polynomial operations; and
      wherein each of the processors are respectively configured to concurrently perform, therewithin, at least a portion of the polynomial operations, and wherein each of the processors are configured to perform multiple types of polynomial operations, including polynomial multiplication and at least one other type of polynomial operation.

14. The electronic device of claim 13 further comprising memories and controllers configured to provide instructions from the memories to the processors, wherein each of the processors are configured to transmit data to at least one other processor through direct communication therewith and be interconnected with a ring structure, the direct communication able to be performed without requiring intervention of the memories or the controllers.

15. The electronic device of claim 13, wherein the electronic device is configured such that one or more of the processors included in a first group of the processors are configured to perform a first operation among the polynomial operations, and
   one or more processors included in a second group of the processors are configured to perform a second operation different from the first operation among the polynomial operations.

16. The electronic device of claim 13, wherein each of the processors comprise:
   one or more first cores configured to perform an operation by executing a plurality of instructions received thereby; and
   one or more second cores configured to perform an operation by executing a proper subset of the instructions in the plurality of instructions, and
   wherein the one or more first cores perform their corresponding operation independently of the one or more second cores performing their operation.

17. The electronic device of claim 16, wherein the one or more first cores are configured to perform their operation in parallel with the one or more second cores performing their operation, and wherein the one or more first cores and the one or more second cores are configured to be synchronized in association with executing their respective operations.

18. The electronic device of claim 13, wherein a first of the processors is configured to transmit data through direct communication with a second of the processors that is not adjacent, in a ring structure, to the first of the processors.

19. The electronic device of claim 13, wherein each of the processors is grouped as one group and processes an instruction received from a corresponding memory as instructed by a corresponding controller.

20. The electronic device of claim 13, wherein the crypto processor is configured to operate on a polynomial generated by a homomorphic encryption algorithm, the polynomial corresponding to a plaintext encoding of a message or a ciphertext encryption of the plaintext.

21. A method comprising:
   receiving, by a processor, a ciphertext that was generated by a computing device executing a homomorphic encryption algorithm on a plaintext, the ciphertext comprising coefficients representing terms of a polynomial, the processor comprising first cores and second cores, the first cores each configured to perform a set of types of polynomial operations, the second cores each configured to perform a subset of the types of polynomial operations, the subset including at least two types of polynomial operations;
   performing, by one of the first cores, a first type of polynomial operation on the ciphertext or on a polynomial derived from polynomial operations on the ciphertext; and
   in parallel with the one of the first cores performing the first type polynomial operation, performing, by one of the second cores, a second type of polynomial operation on the ciphertext or a polynomial derived from polynomial operations on the ciphertext.

22. The method according to claim 21, wherein the processor is interconnected to directly exchange instructions and data with another processor, wherein the other processor comprises third cores configured to perform the set of types of polynomial operations and fourth cores configured to perform the subset of the types of polynomial operations.

23. The method according to claim 22 wherein the processor is directly connected to the other processor in a ring structure of processors.

24. The method according to claim 21, wherein the processor comprises a residue polynomial arithmetic unit (RPAU).

25. The method according to claim 24, wherein the set of types of polynomial operations includes a polynomial arithmetic operation, and wherein the subset of types of polynomial operations does not include the polynomial arithmetic operation.

26. The method according to claim 21, further comprising outputting, by the processor, a second ciphertext generated by the first and second cores performing operations on the ciphertext, wherein a second plaintext generated by homomorphically decrypting the second ciphertext, wherein the second plaintext corresponds to a value that would result from performing the operations on the plaintext.

* * * * *